May 2, 1961
B. R. ADELMAN
2,982,090
MEANS TO PREVENT PERFORATION OF STARTER
DISK DURING IGNITION DELAY
Filed Aug. 6, 1956
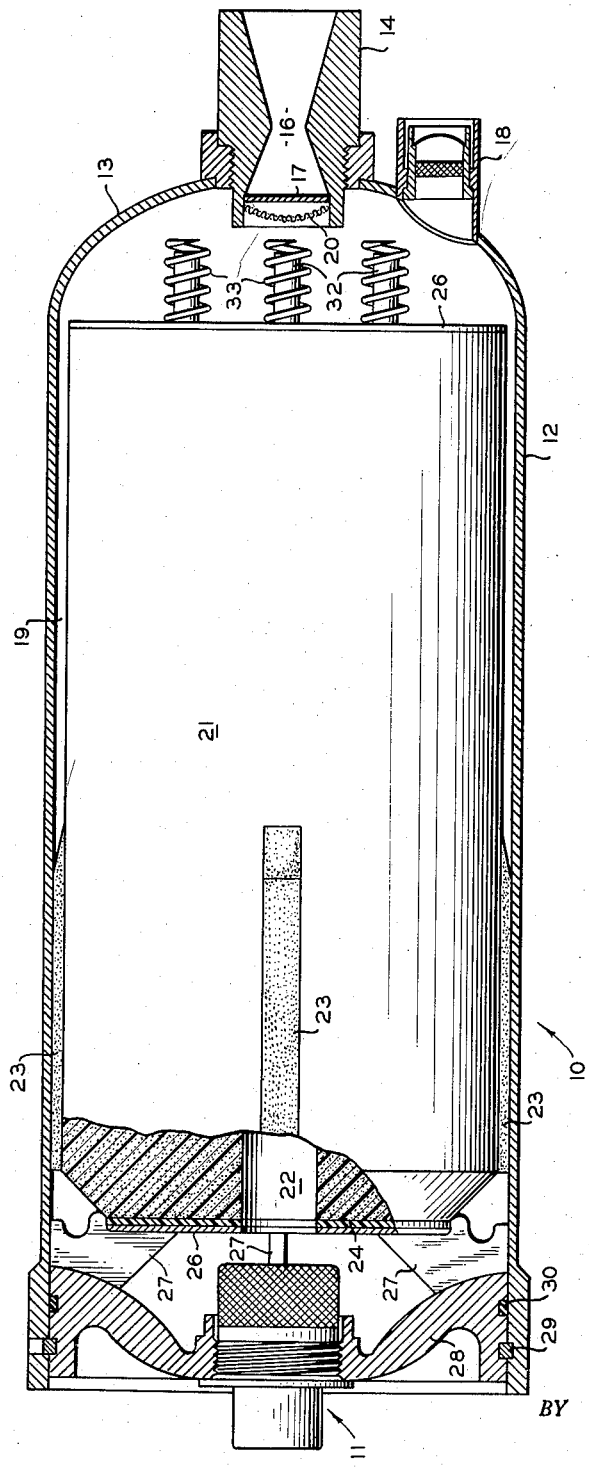
INVENTOR.
B. R. ADELMAN
BY Hudson & Young
ATTORNEYS

United States Patent Office 2,982,090
Patented May 2, 1961

2,982,090

MEANS TO PREVENT PERFORATION OF STARTER DISK DURING IGNITION DELAY

Barnet R. Adelman, Los Angeles, Calif., assignor to Phillips Petroleum Company, a corporation of Delaware Filed Aug. 6, 1956, Ser. No. 602,337

3 Claims. (Cl. 60—35.6)

This invention relates to rocket motors. In one of its aspects it relates to means for preventing premature perforation of the blowout type starter disk during the ignition delay interval.

A rocket motor such as the type used in assisting the take-off of aircraft (hereinafter termed JATO) comprises a rocket motor casing having an exhaust nozzle positioned at one end and a closure member attached to the other end. A solid propellant, for example, an ammonium nitrate propellant, is positioned within the combustion chamber, which is broadly the space defined by the aft-end of the rocket motor casing containing the exhaust nozzle, the fore-end, i.e. closure member noted above, and the rocket motor casing. The frangible disk, also known to the art as a starter disk, is positioned within said exhaust nozzle, thus closing the opening of the nozzle. The rocket motor also contains ignition means to initiate combustion of the solid propellant. One particular ignition means is an igniter cup containing an easily ignitable material positioned within the combustion chamber, spaced from one end of the propellant charge and centrally located with respect to the cross sectional dimensions of the combustion chamber.

Various difficulties have been encountered at one time or another with a JATO type rocket motor. One such difficulty is the premature piercing or perforation of the starter disk before the proper or desirable pressure buildup is attained in the combustion chamber during ignition delay. Danger of projecting ignition fragments (from the igniter) or pieces of propellant or other objects which may be in the rocket motor through the starter disk during ignition delay and before the desired pressure within the combustion chamber has been reached results in a material decrease of the pressure thrust of the rocket motor.

Accordingly, therefore, one or more of the following objects will be achieved by the practice of my invention.

It is an object of my invention to provide an improved rocket motor.

Another object of my invention is to provide means to prevent premature piercing or rupturing of the starter disk of a rocket motor during ignition delay.

A further object of this invention is to provide an improved rocket motor having a wire screen placed across the nozzle opening and positioned between the starter disk and the aft-end of the combustion chamber.

Other objects and advantages of my invention will become apparent to those skilled in the art from consideration of the specification taken in conjunction with the accompanying drawing.

I have found that a wire screen positioned across the fore-end of the exhaust nozzle between the starter disk and the aft-end of the combustion chamber effectively traps ignition fragments, pieces of propellant, or other objects present in the combustion chamber, thus preventing perforation or piercing of the starter disk during the ignition delay period. It is of primary importance that the starter disk remain intact during the ignition delay since any rupture of same will decrease the desired pressure buildup within the combustion chamber and consequently, the pressure thrust of the rocket motor is correspondingly diminished below the optimum.

The installation of the means, i.e. wire screen, for preventing premature rupturing of the frangible disk is simple, convenient and straightforward. The wire screen can be constructed from various metals such as titanium, manganese, chromium, zirconium, molybdenum, copper, palladium, aluminum, nickel, platinum, silver, iron, rhodium, cobalt, gold and the like; alloys of various metals, such as the various stainless steels, e.g., austenitic steel; Inconel (high nickel alloy) etc. Economic considerations, of course, will be one factor governing the choice of the particular metal or alloy or the like employed. The desired pressure buildup and temperature within the combustion chamber and the optimum period of ignition delay are likewise factors which will determine the mesh of the wire screen. The last mentioned factors are ascertainable by those skilled in the rocket art since the size of the rocket motor, the type of propellant, the ignitable material and for means utilized, etc., will influence the mesh size and the particular metal(s) employed. I prefer to use an aluminum screen; i.e. a hardware cloth screen, 2–10 mesh, in a JATO-type rocket motor.

The starter disk is positioned within the fore-end of the exhaust nozzle, and the hardware cloth screen is placed across the nozzle opening in the space defined by the starter disk and the aft-end of the combustion chamber. The periphery of the wire screen can be cemented, soldered, otherwise or affixed to the interior surface of the exhaust nozzle by suitable retaining means. I prefer to crimp the wire screen, i.e. convex shape with respect to the combustion chamber; in this manner the periphery of the wire screen is preferably adjacent to the periphery of the starter disk. Of course, the wire screen can be spaced from the starter disk as the primary function of said screen is to prevent perforation of the starter disk during the ignition delay period. If desired, the crimped screen may be retained in place by an annular flange at the extremity of the fore-end of the exhaust nozzle.

A more complete understanding can be obtained by referring to the following drawing which sets out one embodiment of my invention and which is not to be construed as duly limitative thereof.

The single drawing is an elevation view, partly in section, of a rocket motor, which illustrates a preferred embodiment of the invention.

Referring now to the drawing, there is illustrated a rocket motor 10 which includes igniter assembly 11. The rocket motor comprises a cylindrical casing 12 which has a reduced after portion 13 having an axial opening into which an exhaust nozzle 14 is threaded. The nozzle is formed with internal restrictions so as to define a venturi-like passage 16 through which the combustion gases pass. A blowout diaphragm or disk 17, which covers the inner opening into passage 16, is designed so as to be ejected through the nozzle passage when the chamber pressure reaches a predetermined value. A hardware cloth screen 20 made of aluminum (from 2–10 mesh), formed in convex shape, with respect to combustion chamber 19, is cemented or affixed by other suitable sealing means to the outer rim of periphery of disk 17. Screen 20 will serve to prevent ejected objects or fragments from piercing disk 17 during the ignition delay period. The reduced casing portion of the rocket motor is also provided with a safety plug attachment 18 which is adapted to rupture at a predetermined chamber pressure. By providing for this attachment, the buildup of excessive pressures in the combustion chamber which might rupture the cylindrical casing of the rocket motor is prevented. Any suitable device for releasing excessive pressure can be utilized as is well known to those skilled in the art.

The cylindrical casing defines a combustion chamber 19 in which the solid propellant charge 21 is disposed. The specific propellant charge illustrated is cylindrical in shape and has an outer diameter smaller than the inner diameter of the casing. The propellant is an internal-external burning type by reason of its exposed or unrestricted outer surface and its inner exposed surface which is defined by an axial perforation 22 extending the length of the propellant. A plurality of resilient retaining pads 23, e.g., strips of sponge rubber, are positioned between the head portion of the external burning surface and the adjacent head portion of the casing. The ends of the propellant are restricted by means of a layer of restricting material 24 which has a central opening in alignment with perforation 22. Rertaining plates 26 having similar openings cover the outside of the restricting material. Secured to the head retaining plate are outer-extending prongs or legs 27 which are adapted to register with and are held in place by head closure assembly 28 having retention means for igniter assembly 11. Head closure assembly 28 is held in position in the head end of casing 12 by means of key 29 which fits into appropriate grooves formed in the casing and head closure assembly 28. A sealing ring 30 is positioned in a groove but into assembly 28 to prevent escape of combustion gases from the head end of the casing. The head end of the cylindrical casing is closed by means of head closure assembly 28 in combination with the igniter assembly which is retained in the opening provided in the axial portion of assembly 28. It is noted that the removable cover of the igniter assembly extends through this axial opening.

The after retaining plate has secured to its outer surface a plurality of prongs 32. The prongs are each surrounded by a compression spring 33 adapted to come into contact with the reduced portion 13 of the casing. The after retaining plate is thereby maintained firmly against the restricting material which covers the after end of the solid propellant.

It will be apparent that modifications and variations of the instant invention can be made by one skilled in the art upon consideration of the foregoing disclosure. Such modifications are believed to come within the spirit and scope of the instant invention.

I claim:

1. In a rocket motor having a combustion chamber charged with solid propellant material, ignition means in the forward end of said chamber to initiate combustion of said propellant material, a nozzle attached to the aft-end of said combustion chamber, a blow-out type starter disk placed across the opening of said nozzle, and an axial perforation extending the length of said propellant in alignment with said ignition means and said starter disks, the improvement which comprises a wire mesh member of convex shape taken with respect to the combustion chamber positioned across the fore-end of said nozzle with the periphery of said wire mesh member adjacent the periphery of said blow-out disk, said wire mesh member being positioned between said starter disk and the aft-end of said combustion chamber and convex toward the interior of said combustion chamber thus being spaced from said blow-out disk to prevent perforation of said starter disk during the ignition delay interval.

2. The apparatus of claim 1 wherein said wire mesh means is fabricated of metal of 2 to 10 mesh.

3. The improvement in a rocket motor according to claim 1 wherein said wire mesh member is peripherally affixed to the interior of said exhaust nozzle.

References Cited in the file of this patent

UNITED STATES PATENTS

| | | |
|---|---|---|
| 2,400,242 | Malina et al. | May 14, 1946 |
| 2,455,015 | Mace et al. | Nov. 30, 1948 |
| 2,661,691 | Brandt | Dec. 8, 1953 |
| 2,723,528 | Stark et al. | Nov. 15, 1955 |
| 2,759,326 | Brandt | Aug. 21, 1956 |
| 2,766,904 | Philip | Oct. 6, 1956 |

FOREIGN PATENTS

| | | |
|---|---|---|
| 1,017,432 | France | Sept. 17, 1952 |